United States Patent
Bothello et al.

(10) Patent No.: US 11,461,209 B2
(45) Date of Patent: Oct. 4, 2022

(54) METHODS AND APPARATUS FOR DATACENTER COMMUNICATIONS

(71) Applicant: Walmart Apollo, LLC, Bentonville, AR (US)

(72) Inventors: Gerald Bothello, Foster City, CA (US); Surajit Roy, Gilroy, CA (US); Giridhar Bhujanga, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 221 days.

(21) Appl. No.: 16/263,868

(22) Filed: Jan. 31, 2019

(65) Prior Publication Data

US 2020/0250059 A1    Aug. 6, 2020

(51) Int. Cl.
*G06F 11/30* (2006.01)
*G06F 9/50* (2006.01)
*G06F 9/455* (2018.01)

(52) U.S. Cl.
CPC ...... *G06F 11/3055* (2013.01); *G06F 9/45558* (2013.01); *G06F 9/5027* (2013.01); *G06F 9/5077* (2013.01); *G06F 11/3006* (2013.01); *G06F 2009/45591* (2013.01)

(58) Field of Classification Search
CPC ............. G06F 11/3055; G06F 11/3006; G06F 9/45558; G06F 9/5027; G06F 9/5077; G06F 2009/45591
See application file for complete search history.

(56) References Cited

U.S. PATENT DOCUMENTS

| 8,145,450 B2 * | 3/2012 | Brown | G06F 11/3433 |
| | | | 709/224 |
| 10,303,586 B1 * | 5/2019 | Falko | G06F 11/3636 |
| 10,951,657 B2 * | 3/2021 | Faynberg | G06F 21/57 |

(Continued)

FOREIGN PATENT DOCUMENTS

WO    WO-2012065774 A1 *    5/2012    ............. G06F 21/57

OTHER PUBLICATIONS

T. Zhang and R. B. Lee, "Monitoring and Attestation of Virtual Machine Security Health in Cloud Computing," in IEEE Micro, vol. 36, No. 5, pp. 28-37, Sep.-Oct. 2016, doi: 10.1109/MM.2016.86. (Year: 2016).*

*Primary Examiner* — James R Sheleheda
(74) *Attorney, Agent, or Firm* — Duane Morris LLP; Manita Rawat

(57) ABSTRACT

This application relates to apparatus and methods for communication with and management of datacenters, such as cloud datacenters employing multiple servers. A control server may identify one or more validations to be executed for a plurality of datacenters. The validations may include a test, a configuration, or a status inquiry of the datacenters or servers of the datacenters, for example. The control server may identify a single user request to execute the validations for the plurality of datacenters. Based on the single user request, the control server may generate a plurality of requests based on the identified validations and plurality of datacenters. The control server may transmit the plurality of requests to the plurality of datacenters. The control server may determine if a response to the requests is received, and may provide status for display based on the received responses.

20 Claims, 7 Drawing Sheets

(56) References Cited

U.S. PATENT DOCUMENTS

| | | | |
|---|---|---|---|
| 2009/0276771 A1* | 11/2009 | Nickolov | H04L 67/1008 |
| | | | 718/1 |
| 2015/0052402 A1* | 2/2015 | Gurumurthy | G06F 11/3688 |
| | | | 714/38.1 |
| 2016/0352608 A1* | 12/2016 | Cornell | H04L 43/10 |
| 2016/0366185 A1* | 12/2016 | Lee | H04L 9/3236 |
| 2018/0157522 A1* | 6/2018 | Bafna | G06F 16/182 |
| 2019/0079855 A1* | 3/2019 | Dewitt | G06F 11/3688 |
| 2019/0138729 A1* | 5/2019 | Blundell | H04L 9/3234 |
| 2019/0230073 A1* | 7/2019 | Patel | H04L 63/102 |
| 2019/0235970 A1* | 8/2019 | Mishra | G06F 3/0619 |
| 2019/0258551 A1* | 8/2019 | Cors | G06F 11/1484 |
| 2019/0317750 A1* | 10/2019 | Ramsay | G06F 9/547 |
| 2019/0394096 A1* | 12/2019 | Bernat | H04L 63/123 |
| 2022/0179664 A1* | 6/2022 | Johnson | G06F 9/451 |

\* cited by examiner

METHODS AND APPARATUS FOR DATACENTER COMMUNICATIONS

TECHNICAL FIELD

The disclosure relates generally to data systems that employ servers and, more specifically, to data system communications.

BACKGROUND

Some datacenters, such as cloud datacenters, may employ multiple servers to handle various data processing tasks. For example, a cloud datacenter may employ hundreds of compute servers to process large amounts of data. Datacenters may also include data storage capabilities, such as memory devices that allow for the storage of data, and networking resources that allow for communication among and with the servers. In some datacenter examples, servers may execute one or more hypervisors that run one or more virtual machines (VMs).

To manage datacenters including the various servers, some data systems employ software tools such as Openstack®. For example, each datacenter, and servers within each datacenter, may need to be tested or configured. In addition, in some examples, status information from the datacenters and servers within the datacenters is obtained for datacenter management, such as to learn how "busy" each datacenter or server may be. However, the sending of information to, and receiving of information from, multiple servers in multiple datacenters takes time, which may substantially increase as the number of servers or datacenters under management increase. For example, at least some conventional server management systems allow for communications with just one server at a time. As such, there are opportunities to address datacenter management.

SUMMARY

The embodiments described herein are directed to datacenter, such as cloud datacenter, and server communications. The embodiments may allow for a more efficient mechanism of transmitting data to, and receiving data from, servers of a datacenter. For example, the embodiments may allow for faster communications with multiple datacenters under management. In some examples, the embodiments may allow for more streamlined communications with multiple datacenters.

In accordance with various embodiments, exemplary systems may be implemented in any suitable hardware or hardware and software, such as in any suitable computing device. For example, in some embodiments, a computing device is configured to identify at least one validation to be executed for a plurality of datacenters, such as cloud data centers employing multiple servers. Each validation may include, for example, a test, a configuration, or a status inquiry of the datacenters or servers of the datacenters. The computing device may also be configured to identify the plurality of datacenters for which to execute the at least one validation. The computing device may further be configured to identify a single user request to execute the at least one validation for the plurality of datacenters. The computing device may also be configured to generate, in response to the single user request, a plurality of requests based on the identified at least one validation and the plurality of datacenters, and may further be configured to transmit the plurality of requests to the plurality of datacenters. In some examples, the control server may be configured to determine if a response to the requests has been received, and to provide an indication of whether the response has been received to each of the plurality of requests.

In some embodiments, a method is provided that includes identifying at least one validation to be executed for a plurality of datacenters, and identifying the plurality of datacenters for which to execute the at least one validation. The method may further include identifying a single user request to execute the at least one validation for the plurality of datacenters. The method may also include generating, in response to the single user request, a plurality of requests based on the identified at least one validation and the plurality of datacenters, and transmitting the plurality of requests to the plurality of datacenters. In some examples, the method may include determining whether a response to each request of the plurality of requests has been received, and providing an indication of whether the response has been received to each of the plurality of requests.

In yet other embodiments, a non-transitory computer readable medium has instructions stored thereon, where the instructions, when executed by at least one processor, cause a computing device to perform operations that include identifying at least one validation to be executed for a plurality of datacenters, and identifying the plurality of datacenters for which to execute the at least one validation. The operations may further include identifying a single user request to execute the at least one validation for the plurality of datacenters. The operations may also include generating, in response to the single user request, a plurality of requests based on the identified at least one validation and the plurality of datacenters, and transmitting the plurality of requests to the plurality of datacenters. In some examples, the operations may include determining whether a response to each request of the plurality of requests has been received, and providing an indication of whether the response has been received to each of the plurality of request.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
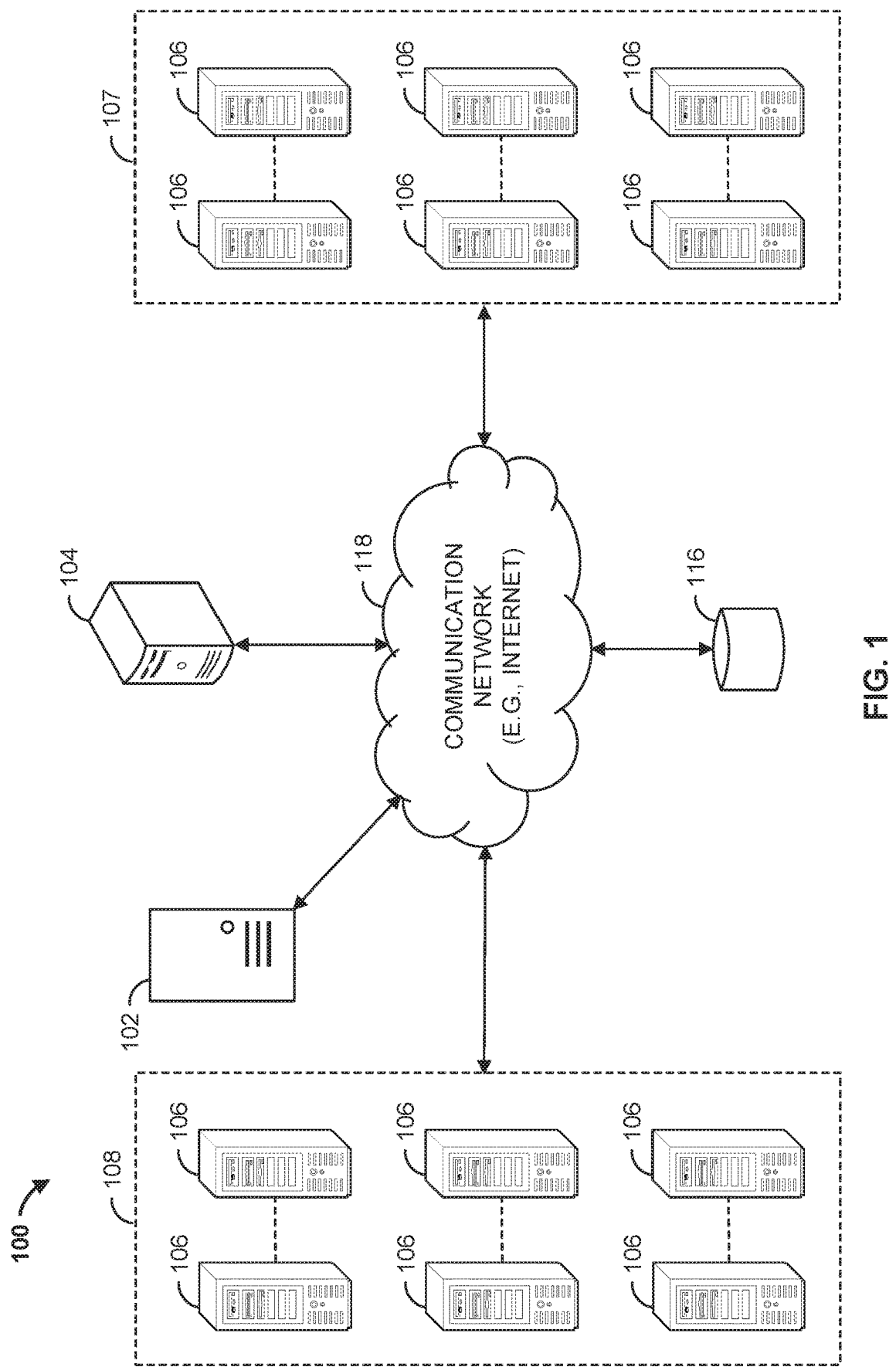
FIG. 1 is a block diagram of a server management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a server management system 100 that includes a control server 102, web server 104, database 116, and compute servers 106 communicatively coupled over network 118. Compute servers 106 may be part of a cloud datacenter 107, or cloud datacenter 108, for example. Control computing device 102, web server 104, and compute servers 106 can each be any suitable computing device that includes any hardware or hardware and software combination for processing and handling information. For example, any of control server 102, web server 104, and compute servers 106 can be a computer, a workstation, a laptop, a server such as a cloud-based server, a web server, a smartphone, or any other suitable device. In addition, each control server 102, web server 104, and compute servers 106 can transmit data to, and receive data from, communication network 118.

Each of control server 102, web server 104, and compute servers 106 can include one or more processors, one or more field-programmable gate arrays (FPGAs), one or more application-specific integrated circuits (ASICs), one or more state machines, digital circuitry, or any other suitable circuitry. Although FIG. 1 illustrates six computer servers 106 in each cloud datacenter 107, 108, server management system 100 can include any number of compute severs 106 in any number of cloud datacenters 107, 108. Similarly, server management system 100 can include any number of control servers 102, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Each of compute servers 106 may run one or more processing tasks, such as hypervisors that execute one or more virtual machines. Each hypervisor may support one or more virtual machines (VMs). For example, each hypervisor may be assigned one or more VMs to run. Each VM may be based on a virtual machine operating system, such as a Microsoft®, Linux®, Red Hat®, MacOS®, or any other VM operating system. Each hypervisor may run one or more of the same, or differing, VMs. Compute servers 106 may be operable to obtain executable code to run the one or more processing tasks from, for example, non-volatile memory. Each processing task may execute among one or more processing cores of a processor, such as a CPU, of a compute server. In some examples, a processing task may execute among one or more processors of a compute server 106, or amount compute servers 106.

In some examples, web server 104 hosts one or more webpages, such as an online retailer's website. The website may allow customers to purchase items, such as goods or services, from the website. To support the website, web server 104 may communicate with one or more of compute servers 106. For example, web server 104 may send transaction data related to the purchase of items to one or more of compute servers 106. In some examples, one or more of compute servers 106 may support the website by providing item information, such as inventory or price information, to web server 104. In some examples, one or more of compute servers 106 provide configuration files to web server 104, to support one or more websites.

Database 116 can be any suitable non-volatile memory, such as a remote storage device, a cloud-based server, a memory device on another application server, a networked computer, or any other suitable non-transitory data storage device. In some examples, database 116 can be a local storage device, such as a hard drive, a non-volatile memory, or a USB stick. Database 116 may store datacenter configuration data such as cloud configuration data or server configuration data. Datacenter 116 may also store status data such as cloud status data or server status data.

Control server 102 may be operable to control and manage compute servers 106 of cloud datacenter 107 and cloud datacenter 108. For example, control server 102 may employ software that facilitates for the control of compute servers 106, such as Openstack®. Control server 102 may be operable to transmit messages (e.g., commands, requests) to compute servers 106, and to receive messages (e.g., responses, status updates) from compute servers 106. For example, control server 102 may be operable to test or configure compute servers 106 of cloud datacenter 107 and compute servers 106 of cloud datacenter 107 by transmitting, in response to a single user request, configuration messages to cloud datacenter 107 and cloud datacenter 108. Similarly, control server may be operable to obtain status information from compute servers 106 of cloud datacenter 107 and compute servers 106 of cloud datacenter 107 by transmitting, in response to a single user request, concurrent data request messages to cloud datacenter 107 and cloud datacenter 108.

For example, control server 102 may obtain hypervisor data, such as processor usage data, allocation data, or processor steal data, from compute servers 106 in cloud datacenter 107 and cloud datacenter 108 by transmitting requests in response to a single user request. For example, control server 102 may receive processor usage data for each compute server 106, where the processor usage data may identify processor consumption for one or more processors. Processor steal data may identify, for example, processor steal times for one or more VMs of a hypervisor executing on a compute server 106. Allocation data may identify, for example, how many VMs are currently running on a hypervisor.

In some examples, in response to a single user request, control server 102 transmits multiple data request messages to multiple cloud datacenters 107, 108 and in response receives cloud datacenter information for each of the multiple cloud datacenters. For example, a user may select various cloud datacenters 107, 108 for a user interface, and may also select one or more validations to be performed on those multiple cloud datacenters 107, 108.

Control server 102 may issue Hypertext Transfer Protocol (HTTP) Application Program Interface (API) calls to various cloud datacenter regions (e.g., within a same cloud datacenter or among multiple cloud datacenters) to obtain data related to the validations. For example, control server 102 may generate HTTP API calls to multiple cloud datacenters 107, 108 to obtain a total number of hypervisors executing in each cloud datacenter region. In some examples, control server 102 generates HTTP API calls to multiple cloud datacenters 107, 108 to determine how many computer servers 106 are part of each cloud datacenter region. In some examples, the HTTP API calls are generate to a specific port to obtain data from the multiple cloud datacenters 107, 108. For example, control server 102 may execute HTTP API calls directed to a particular port to obtain cluster status information. Custer information may include, for example, status information for a cluster of software that supports various functions of a cloud, such as a messaging queue cluster for all cloud agents to post messages and communicate with each other, or a cluster database that stores cloud information. In some examples, control server 102 generates HTTP-based Representational State Transfer (REST) API calls to obtain cluster status information.

In some examples, control server 102 may identify a processing task, such as a hypervisor, that may be in violation of one or more rules. For example, control server 102 may obtain hypervisor data for a plurality of hypervisors executing on compute servers 106 of multiple cloud datacenters 106, 107 in response to one user command. Based on the obtained data, control server 102 may then identify any hypervisor in a plurality of cloud datacenters 107, 108 that be running more than a maximum number of VMs.

In some examples, control server 102 may obtain processor steal data (e.g., rates, times) for VMs of hypervisors executing on processors of compute servers 106 in a plurality of cloud datacenters 107, 108. Control server 102 may identify, for example, VMs with processor steal rates over a maximum threshold, such as 50%.

In some examples, control server 102 may obtain processor consumption data for VMs of hypervisors executing on processors of compute servers 106 in a plurality of cloud datacenters 107, 108. Control server 102 may then identify the VMs being that may be consuming a threshold amount of the processing power of one or more processors (e.g., processor usage rate, CPU consumption, CPU utilization). The threshold amount of processing power may be, for example, a fixed threshold such as a percentage (e.g., 75% utilization). In some examples, the threshold amount of processing power may be a relative amount compared to the processing utilization of other compute server 106 processors (e.g., 50% of the average utilization of all processors in a cloud datacenter).

Figure 2:
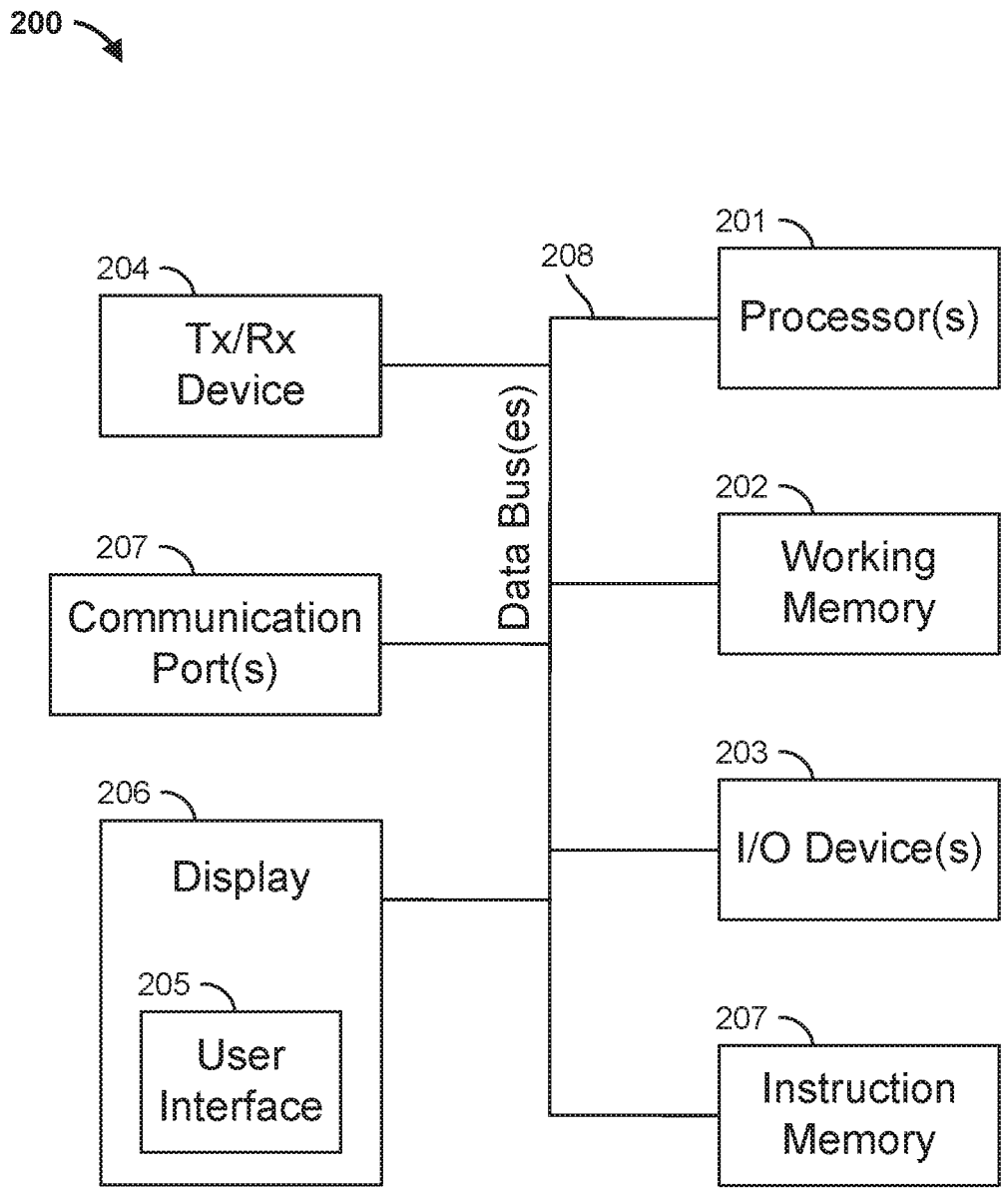
FIG. 2 is a block diagram of the example control server of the server management system of FIG. 1 in accordance with some embodiments.

FIG. 2 illustrates the control server 102 of FIG. 1. Control server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of control server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as hypervisor and VM configuration files.

Display 206 can display user interface 205. User interfaces 205 can enable user interaction with control server 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 control server 102 will be operating in. Processor(s) 201 is operable to receive data from, or send data to, a network, such as communication network 118 of FIG. 1, via transceiver 204.

Figure 3:
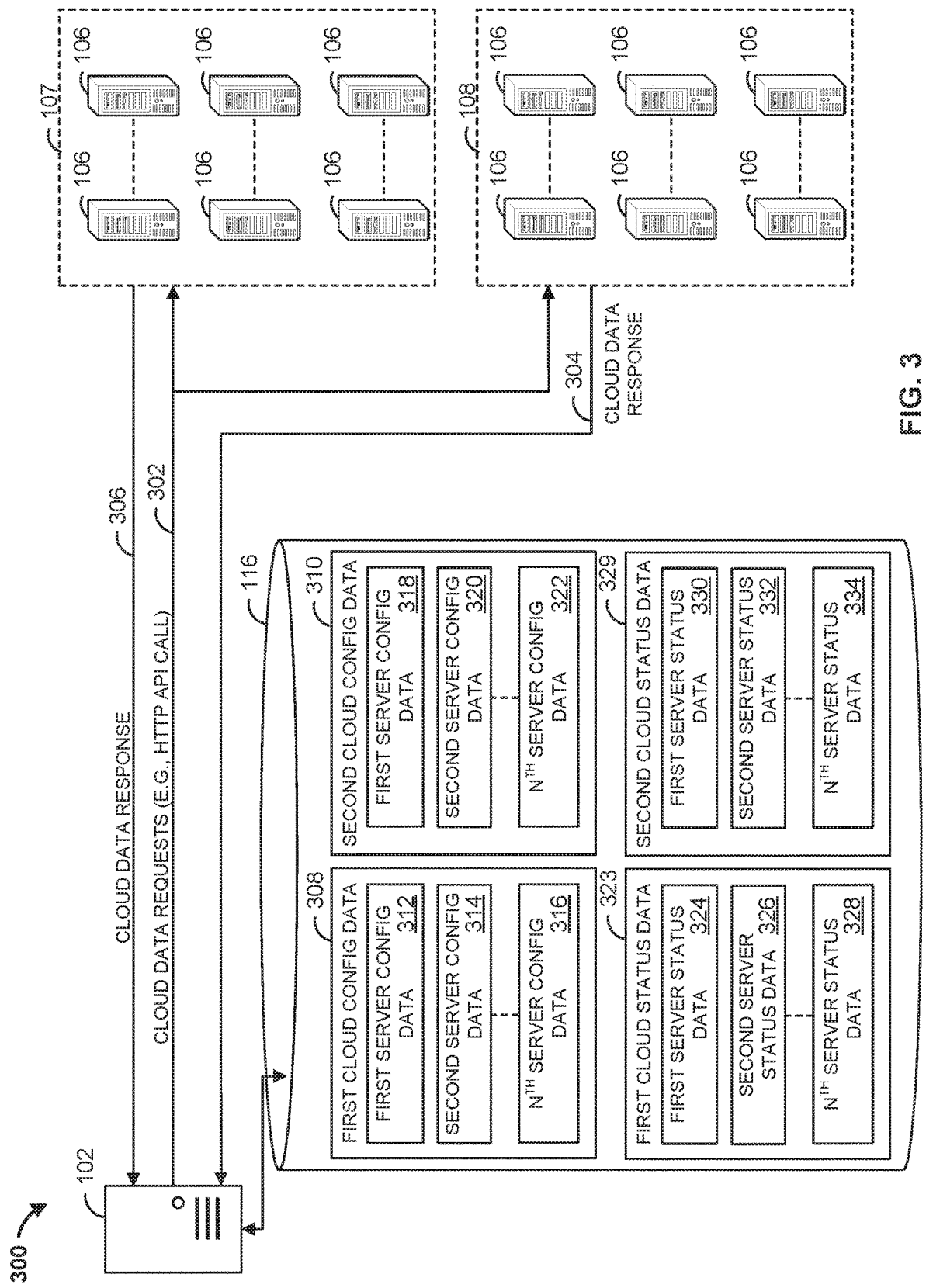
FIG. 3 is a block diagram illustrating examples of various portions of the server management system of FIG. 1 in accordance with some embodiments.

FIG. 3 is a block diagram illustrating examples of various portions of the server management system 100 of FIG. 1. As indicated in FIG. 3, control server 102 is communicatively coupled to database 116 and compute servers 106 in both cloud datacenter 107 and cloud datacenter 108. For example, control server 102 may communicate with database 116 and each compute server 106 of cloud datacenter 107 and compute server 106 of cloud datacenter 108 over network 118.

Control server 102 may generate a plurality of cloud data requests 302 in response to a single user request to obtain cloud datacenter 107, 108 data or compute server 106 data. For example, a user may log in to control server 102 via, for example, a user login screen displayed via user interface 205 on display 206. The user may be required to provide credential information such as a user name and a password, for example. The user may enter the information vi I/O device 203. After successful login, a user may be redirected to a user interface 205 page that allows the user to select multiple validations for multiple cloud datacenters 107, 108. A validation may include, for example, a test (e.g., a health check), a configuration, a validation check, or a status inquiry of a datacenter (e.g., cloud datacenter) or of one or more servers of the datacenter. After selecting one or more validations and one or more cloud datacenters 107, 108, the user may submit a single request to execute the validations, such as by engaging a "SUBMIT" icon on the user interface 205 page.

In response to the single user request, control server 102 may generate a plurality of cloud data requests 302, such as HTTP API calls, to each cloud datacenter 107, 108 to execute the validations. The cloud data requests 302 may be transmitted to, for example, a managing compute server 106 of each respective cloud datacenter 107, 108. The plurality of cloud data requests 302 may include requests for hypervisor data for each compute server 106 of each cloud datacenter 107, 108, for example. Control server 102 may generate the plurality of data requests 302 one after the other. Thus, for example, rather than running a single validation on a single compute server 106, control server 102 allows validations to be performed near simultaneously on multiple compute servers 106 across multiple cloud datacenters 107, 108.

In response to the plurality of cloud data requests 302, cloud datacenter 107 (e.g., a managing compute server 106 of cloud datacenter 107 and a managing compute server 106 of cloud datacenter 108) provides one or more cloud data responses 306, while cloud datacenter 108 provides one or more cloud data responses 304.

In some examples, control server 102 may store cloud configuration data, such as first cloud configuration data 308 and second cloud configuration data 310, to database 116. For example, a user interface 205 page may allow a user to specify the configuration of a cloud datacenter 107, 108. For example, the configuration data may identify hypervisors to be executed on one or more compute servers 106 of each of cloud datacenter 107 and cloud datacenter 108. The configuration data may also identify, for example, what VMs, if any, are to be run by those hypervisors.

Each of first cloud configuration data 307 and second cloud configuration data 310 may include server configuration data for one or more servers (e.g., compute servers) of a respective cloud datacenter 107, 108. For example, as illustrated, database 116 may store server configuration data for a plurality of servers for each of first cloud configuration data 308 and second cloud configuration data 310. For example, first cloud configuration data 308 may pertain to cloud datacenter 107, where first server configuration data 312, second server configuration data 314, and $N^{th}$ server configuration data 316 pertain to one or more computer servers 106 of cloud datacenter 107. Similarly, second cloud configuration data 310 may pertain to cloud datacenter 108, where first server configuration data 318, second server configuration data 320, and $N^{th}$ server configuration data 322 pertain to one or more computer servers 106 of cloud datacenter 108.

In some examples, a user may enter/select the cloud datacenter's configuration via I/O device 203, for example, and may submit a single request (e.g., via selecting a "SUBMIT" icon of the user interface 205) to have the cloud datacenter 107, 108 configured in such a manner as specified. In response to the single request, control server 102 my save the cloud configuration data 308, 310 to database 116, and may generate a plurality of cloud data requests 302 to execute the configurations. Control server 102 may receive, via cloud data response 304 from cloud datacenter 108 and cloud data response 306 from cloud datacenter 107, confirmation as to whether the configurations were carried out successfully.

Control server 102 may receive, via clout data response 304 and cloud data response 306, status information related to cloud datacenter 108 and cloud datacenter 107, respectively. Status information may include, for example, status information related to any compute server 106 of the respective cloud datacenter 107, 108. For example, status information may include any information related to hypervisors executing on each compute server 106, VMs being run by hypervisors such as VM allocation status, computer server 106 status such as processor utilization, software status information, network health, storage health, compute health, API latency, or any other related information.

Control server 102 may store the status information in database 116. For example, control server 102 may store first cloud status data 323, which may include status information pertaining to cloud datacenter 107, to database 116. First cloud status data 323 may include first server status data 324, second status data 326, and Nth status data 328, each pertaining to one or more compute servers 106 of cloud datacenter 107. Similarly, control server 102 may store second cloud status data 329, which may include status information pertaining to cloud datacenter 108, to database 116. Second cloud status data 329 may include first server status data 330, second status data 332, and Nth status data 334, each pertaining to one or more compute servers 106 of cloud datacenter 108. Control server 102 may present the status information to a user via, for example, display 206. For example, user interface 205 may display a status page showing status for one or more of cloud datacenter 107, 108. To display the status page, controller serer 102 may obtain one or more of first cloud configuration data 308 and second cloud configuration data 310 from database 116, and populate status fields within the status page.

Figure 4:
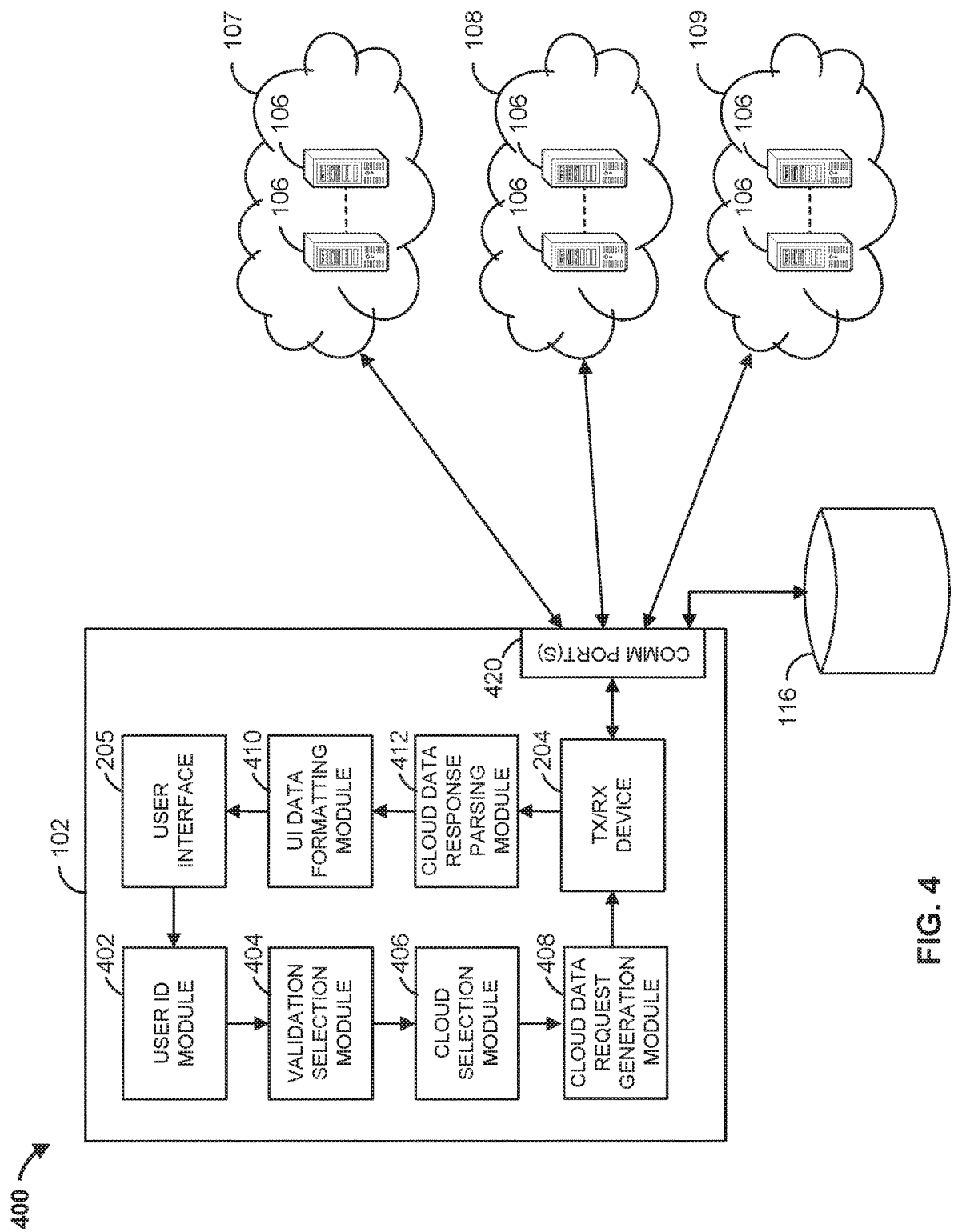
FIG. 4 is another block diagram illustrating the example control server of the server management system of FIG. 1 in accordance with some embodiments.

FIG. 4 is a block diagram illustrating an example of the control server 102 of FIG. 1. As indicated in the figure, control server 102 includes user ID module 402, validation selection module 404, cloud selection module 406 cloud data request generation module 408, user interface (UI) formatting module 410, and cloud data response passing module 412. In some examples, one or more of user ID module 402, validation selection module 404, cloud selection module 406 cloud data request generation module 408, user interface (UI) formatting module 410, and cloud data response passing module 412 may be implemented in hardware. In some examples, one or more of user ID module 402, validation selection module 404, cloud selection module 406 cloud data request generation module 408, user interface (UI) formatting module 410, and cloud data response passing module 412 may be implemented as an executable program maintained in a tangible, non-transitory memory, such as instruction memory 207 of FIG. 2, that may be executed by one or processors, such as processor 201 of FIG. 2.

Figure 5:
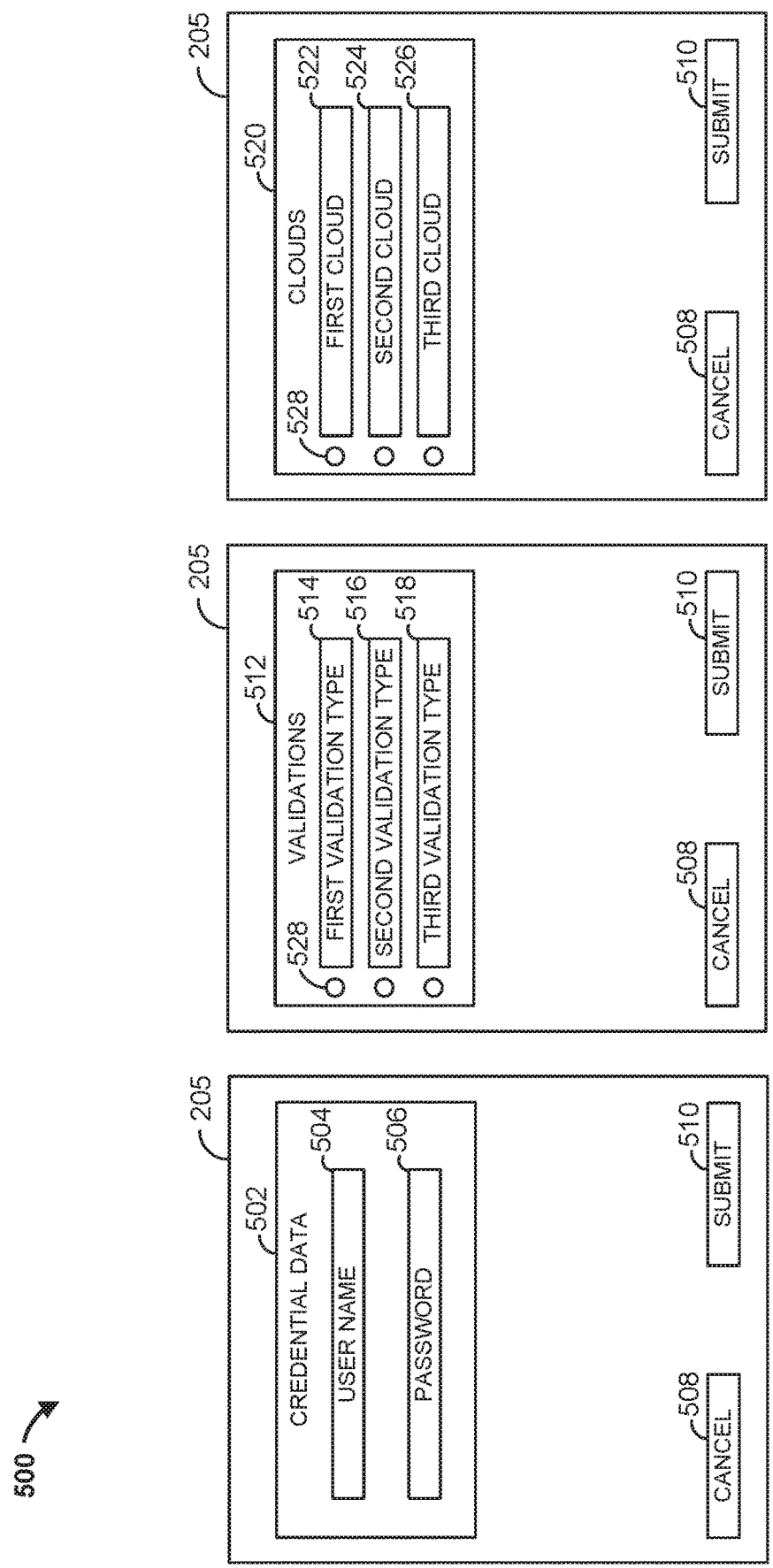
FIGS. 5A, 5B, and 5C illustrate examples of user interface pages that may be employed by the example control server of FIG. 4 in accordance with some embodiments.

In some examples, user interface 205 may present an account verification page where a user may be required to provide credential information (e.g., authentication credentials) such as a user name and a password. For example, FIG. 5A illustrates user interface 205 displaying credential data 502, which includes fillable text boxes for a username 504 and password 506. The user interface 205 also displays a "Cancel" icon 508 and "Submit" icon 510. By selecting the "Cancel" icon 508 (e.g., via I/O device 203), the text in fillable text boxes for the username 504 and password 506 are cleared.

By selecting the "Submit" icon 510, user interface 205 may provide the credential information to user ID module 402, which authenticates the credential information. If the authentication is successful, the user is permitted to log into control server 102. Assuming the authentication is successful, validation selection module 404 may cause user interface 205 to display a validation selection page where a user may select one or more validations for one or more cloud datacenters. For example, the validation selection page may allow the user to select multiple validations to be carried out on cloud datacenter 107, cloud datacenter 108, and cloud datacenter 109.

FIG. 5B illustrates a validation selection page displayed via user interface 205. The validation selection page illustrates various validations 512 including a first validation type 514, a second validation type 416, and a third validation type 518. Each of the validation types may involve a different configuration, or status inquiry, of cloud datacenters, for example. A user may select and deselect the validations 512 my selecting one or more of the radio selection icons 528.

After selecting any validations to be executed, the user may select the "Submit" icon 510, which may cause validation selection module 404 to store the selected validations in memory, such as working memory 202 or database 116. Cloud selection module 406 may then cause user interface 205 to display a cloud selection page where the user may select one or more cloud datacenters that the validations are to be executed for. For example, FIG. 5C illustrates a cloud selection page displayed via user interface 205. The cloud selection page includes the ability to select clouds 520 including first cloud 522, second cloud 524, and third cloud 526 via radio selection icons 528. For example, first cloud 522 may correspond to cloud datacenter 107. Second cloud 524 may correspond to cloud datacenter 108, and third cloud 526 may correspond to cloud datacenter 109.

After selecting any clouds for validation execution, the user may select the "Submit" icon 510, which may cause cloud selection module 406 to store the selected clouds in memory, such as working memory 202 or database 116. Cloud data request generation module 408 may then generate one or more cloud data requests 302 to execute the one or more selected validations on the one or more cloud datacenters 107, 108, 109. For example, cloud data request generation module 408 may obtain the validation selection and cloud selection information from memory, such as working memory 202 or database 116, and generate a plurality of cloud data requests 302 to execute each selected validation on a plurality of cloud datacenters 107, 108, 109, namely, the selected cloud datacenters.

For example, cloud data request generation module 408 may generate a cloud data request 302 to execute first validation type 514, if selected, for any of selected first cloud 522, second cloud 524, and third cloud 526. Similarly, cloud data request generation module 408 may generate a cloud data request 302 to execute second validation type 516, if selected, for any of selected first cloud 522, second cloud 524, and third cloud 526. Cloud data request generation module 408 may also generate a cloud data request 302 to execute third validation type 16, if selected, for any of selected first cloud 522, second cloud 524, and third cloud 526.

Cloud data request generation module 408 may provide the generated cloud data requests 302 to transceiver 204 for transmission to the respective cloud datacenters 107, 108, 109. For example, cloud data request generation module 408 may provide the cloud data requests 302 to transceiver 204 as they are generated, and transceiver 204 may provide them to communication ports 420 to be transmitted over a network, such as network 118. The generated clout data requests 302 may be HTTP API calls to respective cloud regions of each selected cloud. In response to receiving the cloud data requests 302, cloud datacenters 107, 108, 109 may respond with cloud data responses, such as cloud data response 304 and cloud data response 306. Each cloud data response may include, for example, any data requested in the cloud data request 302, or cloud or compute server 106 status information based on the cloud data request 302.

The cloud data response are received via communication ports 420 and provided to transceiver 205. Transceiver 205 receives the cloud data responses and provides them to cloud data response parsing module 412. Cloud data response parsing module 412 may parse each cloud data response to extract the data, and may save the data to, for example, database 116. Cloud data response parsing module 412 may also provide the data to user interface (UI) data formatting module 410, which may format the data as required for display via user interface 205 on display 206. Display 206 may then display the data via user interface 205.

Figure 6:
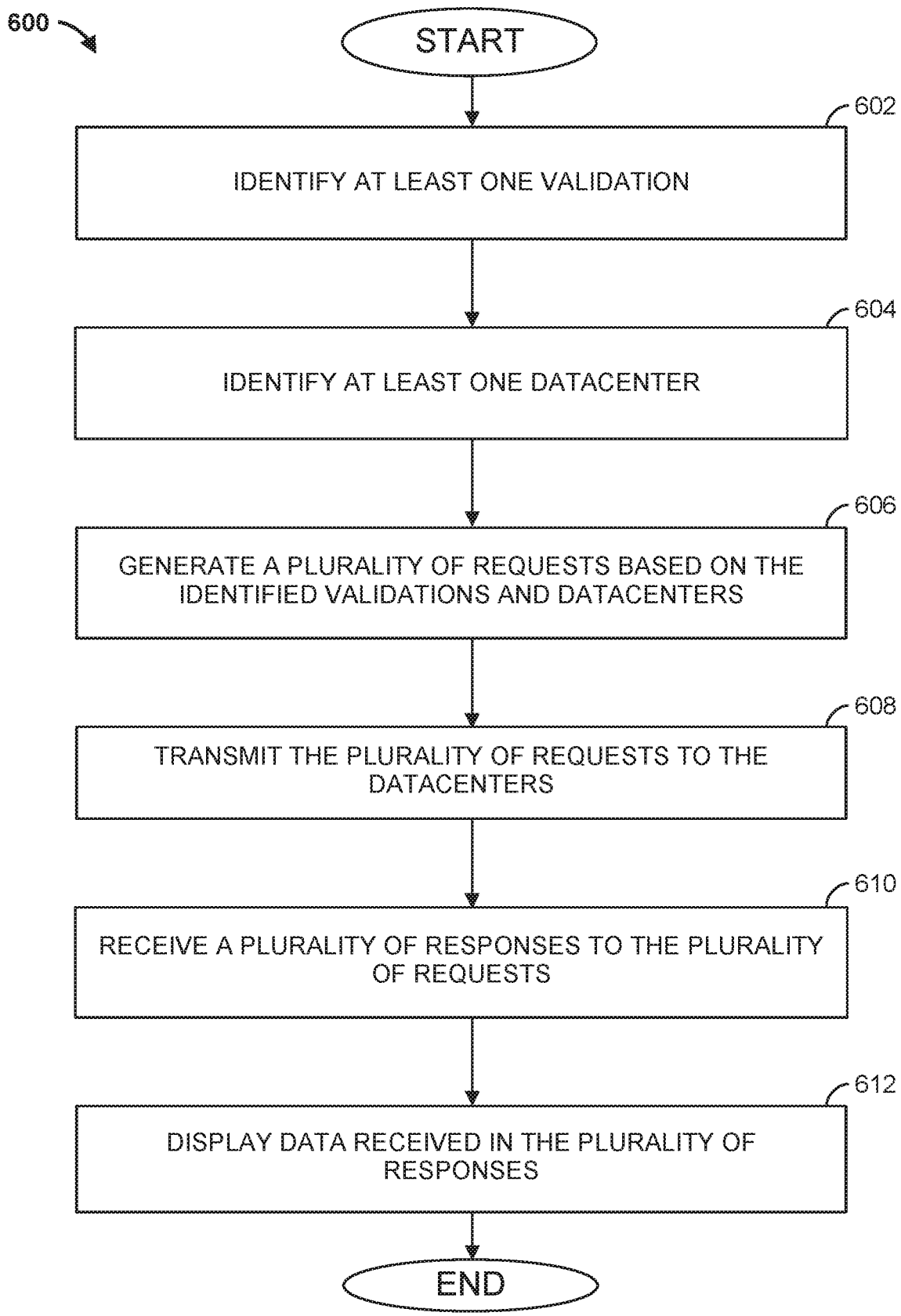
FIG. 6 is a flowchart of an example method that can be carried out by the example control server of FIG. 1 in accordance with some embodiments.

FIG. 6 is a flowchart of an example method 600 that can be carried out by a computing device, such as the control server 102 of FIG. 1. Beginning at step 602, at least one validation is identified. For example, the validation may be a status inquiry, a configuration command, or any other validation. At step 604, at least one datacenter is identified. For example, the datacenter may be a cloud datacenter employing multiple compute servers 106. Proceeding to step 606, a plurality of requests are generated. Each of the plurality of requests may include, for example, a request to one or more servers of the datacenter, to one or more regions of the datacenter, or to multiple datacenters.

At step 608, the plurality of requests are transmitted. For example, the plurality of requests may be transmitted via transceiver 205 one after the other. In response to the transmissions, at step 610 a plurality of responses are received. For example, a response may be received from each server or datacenter a request was transmitted to. At step 612, data received in the plurality of responses are provided for display. For example, the data within the responses may be identified, extracted, and displayed via a user interface 205 displayed on display 206.

Figure 7:
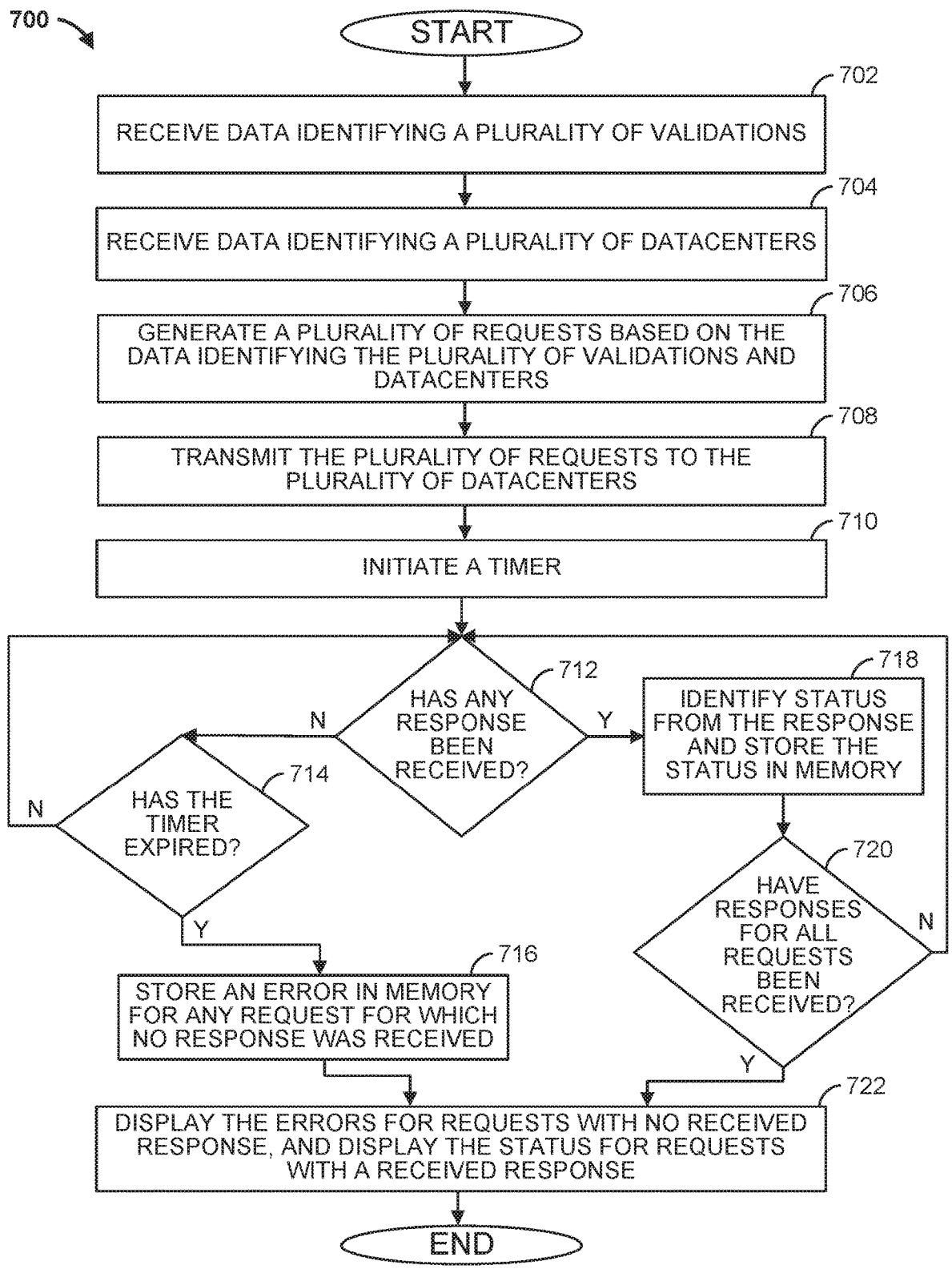
FIG. 7 is a flowchart of another example method that can be carried out by the example control server of FIG. 1 in accordance with some embodiments.

FIG. 7 is a flowchart of an example method 700 that can be carried out by a computing device, such as the control server 102 of FIG. 1. Beginning at step 702, data identifying a plurality of validations is received. For example, the data may identify first validation type 514, second validation type 516, and third validation type 518. Proceeding to step 704, data identifying a plurality of datacenters is received. For example, the data may identify first cloud 522, second cloud 524, and third clouts 526, which may correspond to cloud datacenter 107, cloud datacenter 108, and cloud datacenter 109, respectively. At step 706, based on the data identifying validations and datacenters, a plurality of requests are generated. For example, for each identified validation, a request is generated to each identified datacenter. In some examples, a request to a datacenter may include multiple validations. At step 708, the plurality of requests are transmitted to the identified datacenters.

Proceeding to step 710, a timer is initiated (e.g., started). The timer may be set to a threshold value, such as a number of seconds or minutes, and begins to count down. The method then proceeds to step 712, where the method determines if any response, such as cloud data response 304 or cloud data response 306, to a request has been received.

If, at step 712, a response has been received, the method proceeds to step 718, where status identified in the response is stored in memory, such as in database 116. For example, an indication of the corresponding request, and the status received in the response, may be stored in memory. The method then proceeds to step 720, where a determination is made as to whether responses for all of the requests have been received. If all the responses have not been received, the method proceeds back to step 712, where the method determines if another response has been received. Otherwise, if all the responses have been received, the method proceeds to step 722.

Back at step 712, if no response has been received, the method proceeds to step 714, where a determination is made as to whether the timer has expired. If the timer has not expired, the method proceeds back to step 712, where the method continues to determine if a response has been received. If the timer has expired, the method proceeds to step 716, where, for every request that was transmitted where no response was received, an error indication is stored in memory for that request. For example, if a request for first validation type 514 was transmitted to first cloud 522, but no response was received, an error indicating that the request failed is stored in memory, such as in database 116. The method then proceeds to step 722.

At step 722, which may be proceeded to from step 716 or step 720, an indication of the requests, and their response status, is displayed. For example, if a response was successfully received for a request, the indication of the corresponding request, and the status received in the response as determined in step 718, which may be stored in memory, is displayed, such as via user interface 205 on display 206. If, however, a response was not successfully received, the error indication determined in step 716, which may be stored in memory, is displayed. In other words, for each validation request to each datacenter, a status is displayed indicating whether the validation to that datacenter was successful. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
  a memory device storing instructions; and
  a computing device comprising at least one processor and communicatively coupled to the memory device, wherein the computing device is configured to execute the instructions to:
    provide for display a first user interface that allows for the selection of a plurality of validations;
    receive, in response to a first user input, first selection data identifying at least one validation of the plurality of validations to be executed for a plurality of datacenters, wherein the at least one validation comprises at least one of a test, a configuration, a validation check, or a status inquiry of the plurality of datacenters, and wherein each of the plurality of datacenters comprise a plurality of servers;
    provide for display a second user interface that allows for the selection of the plurality of datacenters;
    receive, in response to a second user input, second selection data identifying the plurality of datacenters for which to execute the at least one validation;
    receive, in response to a third user input, third selection data identifying a single user request to execute the at least one validation for the plurality of datacenters;
    generate, in response to the single user request, a plurality of requests based on the identified at least one validation and the plurality of datacenters; and
    transmit each one of the plurality of requests to a managing compute server of a corresponding one of the plurality of datacenters.

2. The system of claim 1, wherein the computing device is configured to:
  identify the at least one validation based on the first user input; and
  identify the plurality of datacenters based on the second user input.

3. The system of claim 1, wherein the computing device is configured to:
    generate a first request of the plurality of requests for a first datacenter of the plurality of datacenters based on a first validation of the at least one validation; and
    generate a second request of the plurality of requests for a second datacenter of the plurality of datacenters based on the first validation of the at least one validation.

4. The system of claim 3, wherein the computing device is configured to:
    generate a third request of the plurality of requests for the first datacenter of the plurality of datacenters based on a second validation of the at least one validation; and
    generate a fourth request of the plurality of requests for the second datacenter of the plurality of datacenters based on the second validation of the at least one validation.

5. The system of claim 1, wherein the computing device is configured to:
    receive at least one response to the plurality of requests; and
    provide for display the at least one response.

6. The system of claim 1, wherein the computing device is configured to:
    determine whether a response to each request of the plurality of requests has been received; and
    provide an indication of whether the response has been received to each of the plurality of requests.

7. The system of claim 6 wherein the computing device is configured to determine that the response to each request of the plurality of requests has not been received after a period of time has expired.

8. The system of claim 6, wherein the computing device is configured to display the indication of whether the response to each of the plurality of requests has been received.

9. A method comprising:
    providing for display a first user interface that allows for the selection of a plurality of validations;
    receiving, in response to a first user input, first selection data identifying at least one validation of the plurality of validations to be executed for a plurality of datacenters, wherein the at least one validation comprises at least one of a test, a configuration, a validation check, or a status inquiry of the plurality of datacenters, and wherein each of the plurality of datacenters comprise a plurality of servers;
    providing for display a second user interface that allows for the selection of the plurality of datacenters;
    receiving, in response to a second user input, second selection data identifying the plurality of datacenters for which to execute the at least one validation;
    receiving, in response to a third user input, third selection data identifying a single user request to execute the at least one validation for the plurality of datacenters;
    generating, in response to the single user request, a plurality of requests based on the identified at least one validation and the plurality of datacenters; and
    transmitting each one of the plurality of requests to a managing compute server of a corresponding one of the plurality of datacenters.

10. The method of claim 9 further comprising:
    identifying the at least one validation based on the first user input; and
    identifying the plurality of datacenters based on the second user input.

11. The method of claim 9 further comprising:
    generating a first request of the plurality of requests for a first datacenter of the plurality of datacenters based on a first validation of the at least one validation; and
    generating a second request of the plurality of requests for a second datacenter of the plurality of datacenters based on the first validation of the at least one validation.

12. The method of claim 11 further comprising:
    generating a third request of the plurality of requests for the first datacenter of the plurality of datacenters based on a second validation of the at least one validation; and
    generating a fourth request of the plurality of requests for the second datacenter of the plurality of datacenters based on the second validation of the at least one validation.

13. The method of claim 9 further comprising:
    receiving at least one response to the plurality of requests; and
    providing for display the at least one response.

14. The method of claim 9 further comprising:
    determining whether a response to each request of the plurality of requests has been received; and
    providing an indication of whether the response has been received to each of the plurality of requests.

15. The method of claim 14 further comprising:
    determining that the response to each request of the plurality of requests has not been received after a period of time has expired.

16. A non-transitory computer readable medium having instructions stored thereon, wherein the instructions, when executed by at least one processor, cause a device to perform operations comprising:
    providing for display a first user interface that allows for the selection of a plurality of validations;
    receiving, in response to a first user input, first selection data identifying at least one validation of the plurality of validations to be executed for a plurality of datacenters, wherein the at least one validation comprises at least one of a test, a configuration, a validation check, or a status inquiry of the plurality of datacenters, and wherein each of the plurality of datacenters comprise a plurality of servers;
    providing for display a second user interface that allows for the selection of the plurality of datacenters;
    receiving, in response to a second user input, second selection data identifying the plurality of datacenters for which to execute the at least one validation;
    receiving, in response to a third user input, third selection data identifying a single user request to execute the at least one validation for the plurality of datacenters;
    generating, in response to the single user request, a plurality of requests based on the identified at least one validation and the plurality of datacenters; and
    transmitting each one of the plurality of requests to a managing compute server of a corresponding one of the plurality of datacenters.

17. The non-transitory computer readable medium of claim 16 further comprising instructions stored thereon that, when executed by the at least one processor, further cause the device to perform operations comprising:
    identifying the at least one validation based on the first user input; and
    identifying the plurality of datacenters based on the second user input.

18. The non-transitory computer readable medium of claim 16 further comprising instructions stored thereon that, when executed by the at least one processor, further cause the device to perform operations comprising:

generating a first request of the plurality of requests for a first datacenter of the plurality of datacenters based on a first validation of the at least one validation; and generating a second request of the plurality of requests for a second datacenter of the plurality of datacenters based on the first validation of the at least one validation.

19. The non-transitory computer readable medium of claim 18 further comprising instructions stored thereon that, when executed by the at least one processor, further cause the device to perform operations comprising:

generating a third request of the plurality of requests for the first datacenter of the plurality of datacenters based on a second validation of the at least one validation; and generating a fourth request of the plurality of requests for the second datacenter of the plurality of datacenters based on the second validation of the at least one validation.

20. The non-transitory computer readable medium of claim 16 further comprising instructions stored thereon that, when executed by the at least one processor, further cause the device to perform operations comprising:

receiving at least one response to the plurality of requests; and providing for display the at least one response.

* * * * *